(12) United States Patent
Kloth

(10) Patent No.: US 7,577,142 B2
(45) Date of Patent: Aug. 18, 2009

(54) DERIVED VLAN MAPPING TECHNIQUE

(75) Inventor: Raymond Kloth, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 937 days.

(21) Appl. No.: 09/755,512

(22) Filed: Jan. 5, 2001

(65) Prior Publication Data

US 2001/0005369 A1    Jun. 28, 2001

Related U.S. Application Data

(63) Continuation of application No. 09/038,504, filed on Mar. 11, 1998, now Pat. No. 6,208,649.

(51) Int. Cl.
*H04L 12/56* (2006.01)

(52) U.S. Cl. ............... 370/392; 370/389; 370/395.1; 370/401

(58) Field of Classification Search ............ 370/389, 370/392, 395, 401, 409, 410, 395.52, 469, 370/471, 395.1
See application file for complete search history.

(56) References Cited

U.S. PATENT DOCUMENTS

| | | |
|---|---|---|
| 4,864,559 A | 9/1989 | Perlman |
| 4,933,937 A | 6/1990 | Konishi |
| 5,018,137 A | 5/1991 | Backes et al. |
| 5,027,350 A | 6/1991 | Marshall |
| 5,088,032 A | 2/1992 | Bosack |
| 5,140,585 A | 8/1992 | Tomikawa |
| 5,274,631 A | 12/1993 | Bhardwaj |
| 5,304,992 A | 4/1994 | Harashima |
| 5,305,311 A | 4/1994 | Lyles |
| 5,313,454 A | 5/1994 | Bustini et al. |
| 5,361,256 A | 11/1994 | Doeringer et al. |
| 5,394,394 A | 2/1995 | Crowther et al. |
| 5,394,402 A | 2/1995 | Ross |
| 5,414,704 A | 5/1995 | Spinney |
| 5,430,715 A | 7/1995 | Corbalis et al. |
| 5,473,607 A | 12/1995 | Hausman et al. |
| 5,500,860 A | 3/1996 | Perlman et al. |
| 5,511,168 A | 4/1996 | Perlman et al. |
| 5,612,959 A | 3/1997 | Takase et al. |
| 5,617,421 A | 4/1997 | Chin et al. |
| 5,633,858 A | 5/1997 | Chang et al. |

(Continued)

OTHER PUBLICATIONS

"IEEE Standards for Local and Metropolitan Area Networks: Virtual Bridged Local Area Networks", IEEE Std 802. 1Q-1998, Copyright 1999, IEEE, pp. 1-199.

(Continued)

*Primary Examiner*—William Trost, IV
*Assistant Examiner*—Toan D Nguyen
(74) *Attorney, Agent, or Firm*—Cesari and McKenna LLP (57) ABSTRACT

A method of operating a switch for frames in a computer network uses one or more indicia of frame type designation found in the received frame to derive a virtual local area network (derived VLAN) value. Also, an indicia of the receiving port may be used in constructing the derived VLAN value. The switch then uses the derived VLAN value in making forwarding decisions. Broadcast domains in the computer network may then be controlled by forwarding in response to the derived VLAN value.

25 Claims, 6 Drawing Sheets

U.S. PATENT DOCUMENTS

| | | | | |
|---|---|---|---|---|
| 5,633,869 | A | | 5/1997 | Burnett et al. |
| 5,684,800 | A | | 11/1997 | Dobbins et al. |
| 5,740,171 | A | | 4/1998 | Mazzola et al. |
| 5,742,604 | A | | 4/1998 | Edsall et al. |
| 5,752,003 | A | | 5/1998 | Hart |
| 5,764,636 | A | | 6/1998 | Edsall |
| 5,796,732 | A | | 8/1998 | Mazzola et al. |
| 5,796,740 | A | | 8/1998 | Perlman et al. |
| 5,872,783 | A | | 2/1999 | Chin |
| 5,914,938 | A | * | 6/1999 | Brady et al. ............. 370/254 |
| 5,917,820 | A | | 6/1999 | Rekhter |
| 5,959,990 | A | * | 9/1999 | Frantz et al. ............. 370/392 |
| 5,991,302 | A | | 11/1999 | Berl et al. |
| 6,023,563 | A | * | 2/2000 | Shani ................... 709/249 |
| 6,035,105 | A | | 3/2000 | McCloghrie et al. |
| 6,041,058 | A | * | 3/2000 | Flanders et al. ........... 370/401 |
| 6,064,674 | A | * | 5/2000 | Doidge et al. ............. 370/398 |
| 6,208,649 | B1 | | 3/2001 | Kloth |
| 6,219,699 | B1 | | 4/2001 | McCloghrie et al. |
| 6,269,098 | B1 | * | 7/2001 | Crayford ................. 370/389 |

OTHER PUBLICATIONS

IEEE, "Draft Standard for Virtual Bridged Local Area Networks," pp. 1-10 and 70-72 (May 1997).

Deering, S., and Cheriton, D., "Multicast Routing in Datagram Internetworks and Extended LANs," vol. 8, ACM Transactions on Computer Systems, pp. 85-110 (May 1990).

Deering, S. et al., "An Architecture for Wide-Area Multicasting," Proceedings of SIGCOMM '94 Conf., ACM, pp. 126-135 (Oct. 1994).

"Cisco VLAN Roadmap", http://www.cisco.com/warp/public/538/7.html, pp. 1-9, posted Jul. 17, 1995.

"Cisco Catalyst Workgroup Switch Version 3.0," http://www.cisco.com/warp/public/558/16.html, pp. 1-5, posted Aug. 29, 1994.

"Virtual Networking Services," http://www.cisco.com/warp/public/614/5.html, pp. 1-10, posted Oct. 28, 1997.

"Cisco LAN Switching Products," http://www.cisco.com/warp/public/534/16.html, pp. 1-21, posted Mar. 31, 1995.

"Multicast Routing," http://www.cisco.com/warp/public/614/17.html, pp. 1-3, posted Aug. 3, 1995.

"IP Multicast Streamlines Delivery of Multicast Applications," http://www.cisco.com/warp/public/674/4.html, pp. 1-4, posted Feb. 24, 1998.

"Catalyst 1200 Release 4.0," http://www.cisco.com/warp/public/558/49.html, pp. 1-7, posted May 18, 1995.

"Cisco IOS VLAN Services," http://www.cisco.com/warp/public/614/11.html, pp. 1-3, posted Jan. 21, 1998.

"Cisco IOS Technologies," http://www.cisco.com/warp/public/732/ciscoios.html, pp. 1-2, 1997.

"The Virtual LAN Technology Report," http://www.3com.com/nsc/200374.html, pp. 1-19, 1998.

"ATM Internetworking," http://www.cisco.com/warp/public/614/12,html#LANE, pp. 1-58, posted Jun. 1, 1995.

Lucent's and Prominet's Motion for Leave To Amend Their Amended Complaint, with Exhibits being filed in *Lucent Technologies, Inc. and Prominet Corporation v. Cisco Systems, Inc. and Cisco Technology, Inc.*Civil Action No. 98-349 (JJF).

"Cisco Introduces VLAN Solution," Communications Industry Researchers, Broadband Networks and Applications, Apr. 15, 1995.

"Cisco Announces Token-Ring Switching Products," Communications Industry Researchers, Broadband Networks and Applications, Apr. 15, 1995.

"Chipcom and Cisco To Collaborate On ATM Networking Solutions," Communications Industry Researchers, Broadband Networks and Applications, Apr. 15, 1995.

"Cisco Announces New Fast Ethernet Interface," Communications Industry Researchers, Broadband Networks and Applications, Apr. 15, 1995.

Lucent Technologies, Inc.'s Initial Disclosure of Prior Art under Civil Local Rule 16-7, dated Nov. 18, 1998.

Cisco 700 Series Gains Fast Ethernet Interface, Becomes Only Router Family to Support Three High-Speed Network Types, web, http://www.cisco.com/warp/public/146/199.html, pp. 1-2.

ISL Function Specification, web, http://www.cisco.com/warp/public/741/4.html, pp. 1-4.

Configuring VTF and Virtual LANs, Catalyst 5000 Series Software Configuration Guide, Chapter 13, pp. 13-24.

Cisco-Catalyst 5000 Software Release 2.1 Feature Set, web, http://www.cisco.com/warp/public/729/c5000/426_pp.htm, pp. 1-9.

IEEE Standard Project P802.10, Draft Standard for Virtual Bridged Local Area Networks, Copyright by the Institute of Electrical and Electronics Engineers, Inc., Feb. 28, 1997, pp. 1-88.

Draft Standard P.802.1Q/D10, IEEE Standards for Local and Metropolitan Area Networks: Virtual Brdiged Local Area Networks, Copyright by the Institute of Electrical and Electronics Engineers, Inc., Mar. 22, 1997, pp. 1-212.

ISL Configurations for Cisco IOS and the Catalyst 5000, web, http://www.cisco.com/warp/public/741/8.html, pp. 1-8.

Dynamic Inter-Switch Link Protocol, 2.2 Configuration Note, pp. 2-6.

Virtual LANs, Catalyst 2820 Series and Catalyst 1900 Series Enterprise Edition Software Configuration Guide, Chapter 2, pp. 2-1-2-49.

\* cited by examiner

DERIVED VLAN MAPPING TECHNIQUE

CROSS-REFERENCE TO RELATED APPLICATIONS

The present application is a continuation of commonly assigned U.S. patent application Ser. No. 09/038,504, now issued as U.S. Pat. No. 6,208,649, which was filed on Mar. 11, 1998, by Raymond Kloth for a Derived VLAN Mapping Technique and is hereby incorporated by reference.

BACKGROUND OF THE INVENTION

1. Field of the Invention

This invention relates generally to computer networks and, more specifically, to a technique that enables control of broadcast domains by a switch capable of supporting different protocols within a computer internetwork.

2. Background Information

Communication in a computer internetwork involves the exchange of data between two or more entities interconnected by communication media. The entities are typically software programs executing on hardware computer platforms, such as end stations and intermediate stations. In particular, communication software executing on the end stations correlate and manage data communication with other end stations. The stations typically communicate by exchanging discrete packets or frames of data according to predefined protocols. A protocol, in this context, consists of a set of rules defining how the stations interact with each other.

A switch is an example of an intermediate station having a plurality of ports that interconnect the communication media to form a relatively small domain of stations, such as a subnetwork. Subnetworks or subnets provide an organizational overlay to an internetwork that facilitates transmission of data between the end stations, particularly for broadcast transmissions. Broadcasting is a powerful tool used to send a single frame to many stations at the same time. However, improper use of broadcasting can impact the performance of stations by interrupting them unnecessarily. The subnet functions to limit the proliferation of broadcast frames to stations within a broadcast domain. A router is an intermediate station that interconnects domains or subnets and executes network routing software to allow expansion of communication to end stations of other subnets. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the internetwork. Predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the internetwork. Examples of communications architectures include the Internet Packet Exchange (IPX) communications architecture and, as described below, the Internet communications architecture.

The Internet architecture is represented by four layers which are termed, in ascending interfacing order, the network interface, internetwork, transport and application layers.

Figure 1:
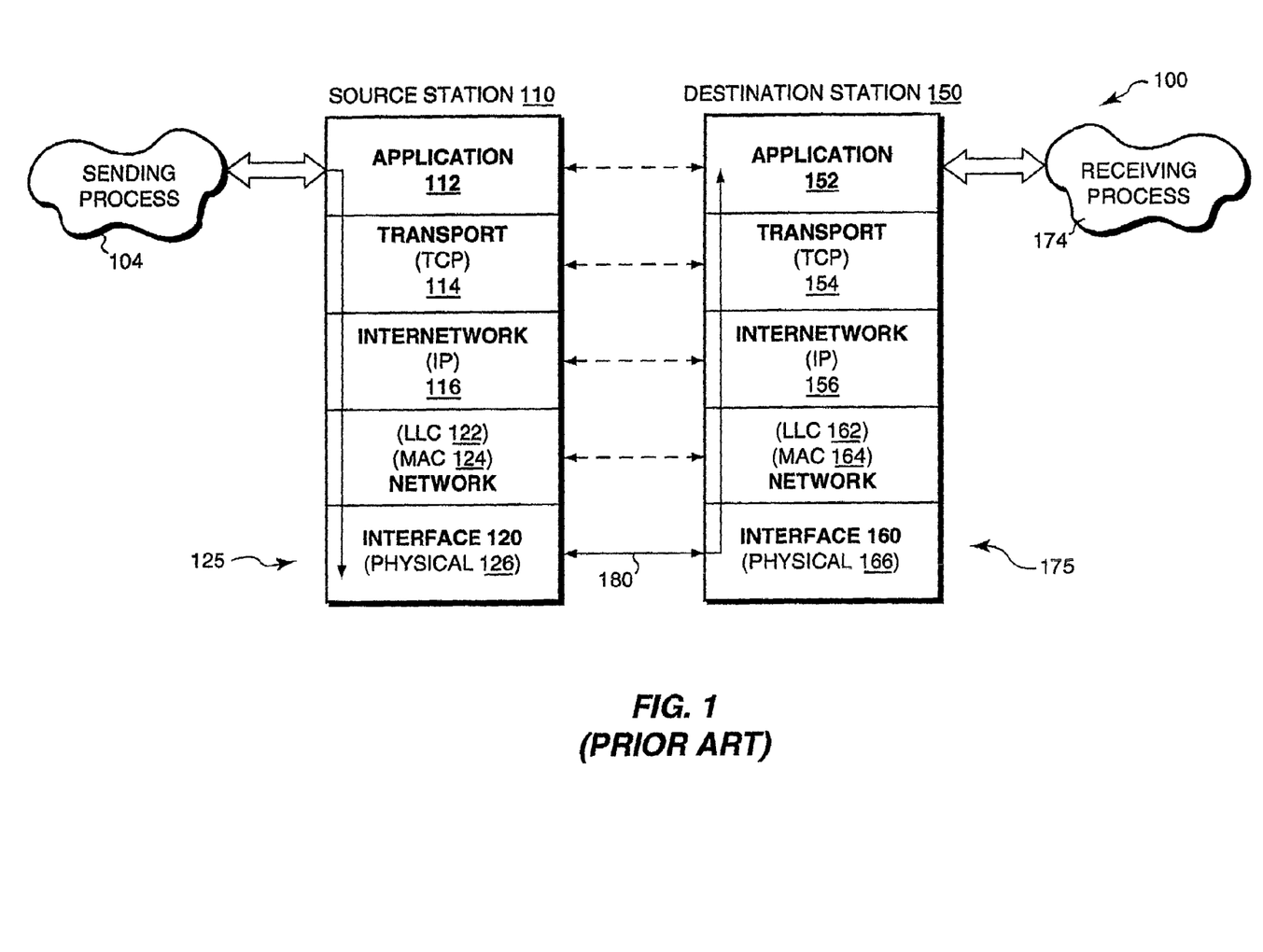
FIG. 1 is a schematic block diagram of prior art communications architecture protocol stacks used to transmit data, such as frames, between stations of a computer internetwork.

These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of an internetwork 100. As can be seen, the stacks 125 and 175 are physically connected through a communications medium 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the internetwork, while the lower network interface layer 120 accepts industry standards defining a flexible network architecture oriented to the implementation of local area networks (LANs).

Specifically, the network interface layer 120 comprises physical and data link sublayers. The physical layer 126 is concerned with the actual transmission of signals across the communication medium and defines the types of cabling, plugs and connectors used in connection with the medium. The data link layer (i.e., "layer 2") is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the internetwork.

The primary network layer protocol of the Internet architecture is the Internet protocol (IP) contained within the internetwork layer 116. IP is a network protocol that provides internetwork routing and relies on transport protocols for end-to-end reliability. An example of such a transport protocol is the Transmission Control Protocol (TCP) contained within the transport layer 114. The term TCP/IP is commonly used to refer to the Internet architecture. Protocol stacks and the TCP/IP reference model are well-known and are, for example, described in *Computer Networks* by Andrew S. Tanenbaum, printed by Prentice Hall PTR, Upper Saddle River, N.J., 1996.

Data transmission over the internetwork 100 therefore consists of generating data in, e.g., sending process 104 executing on the source station 110, passing that data to the application layer 112 and down through the layers of the protocol stack 125, where the data are sequentially formatted as a frame for delivery onto the medium 180 as bits. Those frame bits are then transmitted over an established connection of medium 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the internetwork layer encapsulates data presented to it by the transport layer within a packet having a network layer header. The network layer header contains, among other information, source and destination (logical) network addresses needed to complete the data transfer. The data link layer, in turn, encapsulates the packet in a frame, such as a conventional Ethernet frame, that includes a data link layer header containing information required to complete the data link functions, such as (physical) MAC addresses. At the destination station 150, these encapsulated headers are stripped off one-by-one as the frame propagates up the layers of the stack 175 until it arrives at the receiving process.

Figure 2:
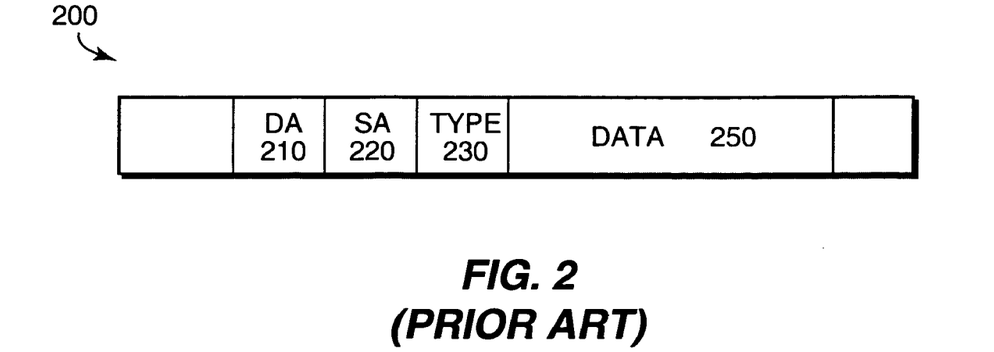
FIG. 2 is a schematic diagram of a format of an Ethernet frame that may be advantageously used for transmitting data between stations of the internetwork of FIG. 1.

FIG. 2 is a schematic diagram of a frame format of an Ethernet frame 200 comprising destination and source MAC address fields 210, 220 and a protocol type field 230 that identifies the protocol (e.g., IP, IPX, AppleTalk, DECNet) of the data carried by the frame. Data field 250 contains information, including the network addresses, provided by the higher internetwork layers of the protocol stack. These network addresses are used by network layer protocols to identify source or destination stations of packets in the internetwork. Unlike the MAC address that has a predefined relationship to a station, the network address has a logical relationship that is typically established by a network administrator who assigns the address according to a predetermined network addressing arrangement. The assigned network address conveys information that can be used by the router when routing the packet through the internetwork. If the network address is hierarchical, the router may use a portion of the address to route the packet to a higher-level partition or domain in the internetwork.

Figure 3:
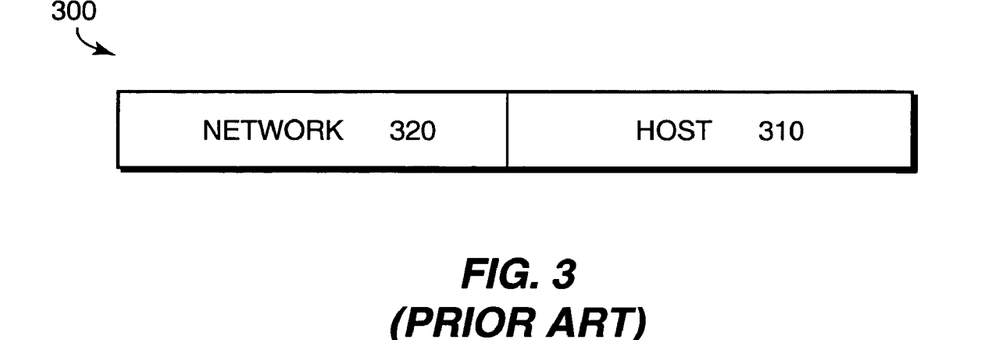
FIG. 3 is a schematic diagram of a format of a network address, such as an Internet protocol that may be advantageously used with the present invention.

For example, an IP network may be subdivided into subnets which are defined in a portion of an IP address. FIG. 3 is a schematic diagram of a format of an IP address 300 comprising a host portion 310 that identifies a station and a network portion 320 that describes a subnet number of the internetwork. Subnets offer a form of hierarchical addressing that is used by IP routing algorithms to perform hierarchical or prefix routing operations. These algorithms maintain information of all higher-level routing environments in routing tables for domains by recording their shortest unique address prefixes.

Figure 4:
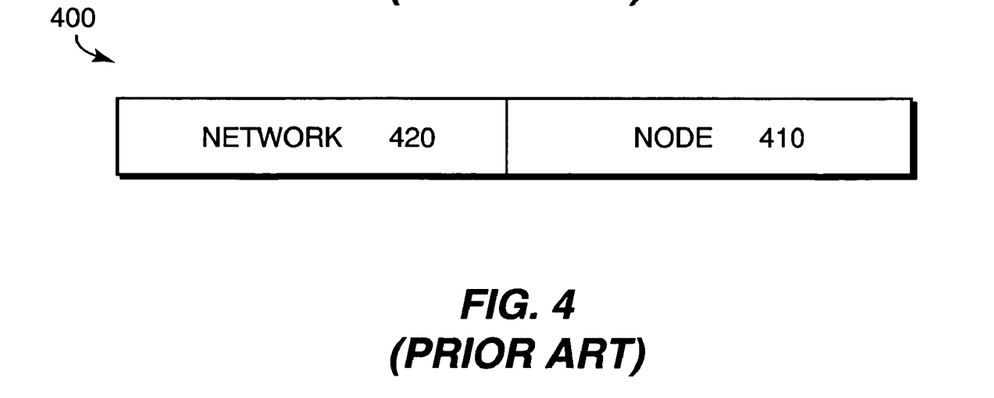
FIG. 4 is a schematic diagram of a format of another network address, such as an Internet Packet Exchange address that may be advantageously used with the present invention.

A station that supports more than one network layer protocol has multiple network addresses and multiple protocol stacks that present the same MAC address on a port for the different protocols. For example, a multi-protocol stack station connected to both an IP and an IPX network is assigned an IP network address and an IPX network address. FIG. 4 is a schematic diagram of a format of an IPX address 400 comprising a node portion 410 that identifies the MAC address of a station and a network portion 420 that identifies an IPX network number of the internetwork. The IPX network number is not inherently hierarchical, so hierarchical routing is not generally available with this protocol.

U.S. Pat. No. 5,394,402, issued on Feb. 28, 1995 to Floyd E. Ross (the "'402 Patent"), discloses an arrangement that is capable of associating any port of a switch with any particular segregated network group. According to the '402 Patent, any number of physical ports of a particular switch may be associated with any number of groups within the switch by using a virtual local area network (VLAN) arrangement that virtually associates the port with a particular VLAN designation. Specifically, Ross discloses a switch or hub for a segmented virtual local area network with shared media access that associates VLAN designations with at least one internal port and further associates those VLAN designations with messages transmitted from any of the ports to which the VLAN designation has been assigned.

The VLAN designation assigned (e.g., programmed) to each internal port is stored in a memory portion of the switch such that every time a message is received by the switch on an internal port the VLAN designation of that port is associated with the message. Association is accomplished by a flow processing element which looks up the VLAN designation in a memory based on the internal port where the message originated. In addition to the '402 patent, an IEEE standards committee is proposing a standard for Virtual Bridged Local Area Networks. See IEEE Standard 802.1q.

In many cases, it may be desirable to interconnect a plurality of switches in order to extend the VLAN associations of ports in the internetwork. Ross, in fact, states that an objective of his VLAN arrangement is to allow all ports and entities of the network having the same VLAN designation to interchange messages by associating a VLAN designation with each message. Those entities having the same VLAN designation function as if they are all part of the same LAN. Each VLAN may be further associated with a subnet or broadcast domain so as to constrain broadcasting of frame messages to a defined subset of stations, preferably through "bridging" operations of the switch. As noted, a broadcast domain is the smallest number of ports needed to receive a broadcast frame of a particular protocol type (IP, IPX, AppleTalk, DECNet, etc). For example, the granularity of a broadcast domain for an IP frame may comprise a subnet, whereas for an IPX frame the broadcast domain may be defined as all stations belonging to an IPX network. Message exchanges between areas of the internetwork having different VLAN designations are generally limited to routing operations in order to preserve the boundaries of each broadcast domain.

The IPX protocol generally manifests as a broadcast of messages and, as a result, an IPX network typically has a fixed, one-to-one relationship with a VLAN domain. The IP protocol, however, does not generally broadcast messages because its higher-level protocols maintain a history of routes to neighboring end stations. IP protocols thus support multi-netting, which is a router function that involves assigning several IP subnets to the same VLAN. Since IPX does not support multi-netting, VLANs are often individually assigned among IPX networks coupled to ports of a switch. This creates a problem for a multiprotocol switching environment that includes an IP subnet associated with a single VLAN.

A known solution to this problem involves classifying VLANs "on-the-fly" at each input port as a message enters the switch. This type of distributed control system is an expensive solution which does not scale well and is generally difficult to manage. An additional concern with such a distributed system is the need for customers to upgrade all of the ports of a switch, which may be prohibitive in certain cases.

Attempts to control broadcast domains for different protocols carried by frames present further problems in that one domain is not necessarily a subset of the other. Assume a multi-port switch is statically configured (programmed) such that half of the ports are assigned a first VLAN designation for a first IPX network and the other half of ports are assigned a second VLAN designation for a second IPX network. Assume it is also desired to associate all of the ports with a single IP subnet having the same VLAN designation. Current multi-protocol switching environments cannot reconfigure VLANs previously programmed to physical ports of a switch to support such overlapping VLAN designations. As a result, the IP subnet would have to be apportioned into at least two VLANs in accordance with the programmed port assignments. This approach would effectively eliminate an advantage provided by subnetting, namely, the transfer of frames using bridging, instead of routing, operations.

Thus, an object of the present invention is to provide a system capable of controlling broadcast domains for different protocols supported by an internetwork switch.

Another object of the present invention is to provide a centralized forwarding technique capable of associating different VLANs with a defined broadcast domain of an internetwork.

Yet another object of the present invention is to provide a mapping technique that promotes bridging operations within defined broadcast domains controlled by a switch of an internetwork.

SUMMARY OF THE INVENTION

The invention relates to a derived virtual local area network (VLAN) mapping technique that enables centralized control of broadcast domains by a switch capable of supporting different protocols carried within frames that are distributed throughout a computer internetwork. Associated with each incoming frame received at the switch are characteristics such as protocol type and/or subnet values, and associated with each input port of the switch are characteristics such as VLAN and/or index values. Utilizing certain of these characteristics, a derived VLAN value is generated that allows users to create arbitrary VLAN domains through the ports which, in turn, may reduce broadcast traffic received by stations of the domains.

In accordance with the invention, the derived VLAN mapping technique manifests as a plurality of illustrative embodiments that allow segregation of broadcast domains based on the protocol type, port VLAN, subnet and/or index values. Depending upon the embodiment, certain of these values are manipulated to create a mapping address that selects one of a plurality of entries of a translation structure. Each entry of the structure is configured with a derived VLAN value that is used to access a single forwarding database to, inter alia, determine a destination and output port for the frame.

For example, a port VLAN-based derived VLAN embodiment concatenates a protocol code associated with an incoming frame with a VLAN value assigned to the input port receiving the frame to generate the mapping address that is used to access the translation structure, which is preferably a mapping random access memory (RAM) device. Concatenating a protocol code with a port VLAN may produce different derived VLAN values for a similar media access control (MAC) address. The derived VLAN mapping function "front-ends" the forwarding database to effectively simulate multiple forwarding databases, e.g., one per protocol. These simulated databases merge when similar protocols map to the same derived VLAN values and, in fact, occupy the same physical location.

A subnet-based derived VLAN mapping embodiment generates the mapping address based on a subnet address of an incoming frame rather than the protocol type. Here, the subnet information is extracted from the incoming frame and provided to a translation structure configured as a content addressable memory (CAM). Alternatively, an index-based derived VLAN embodiment uses an index value (rather than the port VLAN) assigned to the input port to generate the mapping address for accessing the mapping RAM. In each embodiment, the resulting derived VLAN value is used to access the forwarding database to (i) "learn" a MAC address based upon a source MAC address of the incoming frame and (ii) forward the incoming frame based upon a destination MAC address of the frame.

Advantageously, the centralized derived VLAN mapping arrangement enables efficient management in a single forwarding database that is generally more cost effective and scaleable than prior distributed solutions. The translation and forwarding structures are generally configured by software and run at line rate on the hardware switching platform. Modifications in such an arrangement can be made centrally without replacing all of the port cards; that is, a change to one location in the mapping RAM/CAM can instantly reconfigure the entire system. The mapping technique is also backward compatible with a supervisor card upgrade to existing switches.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 5:
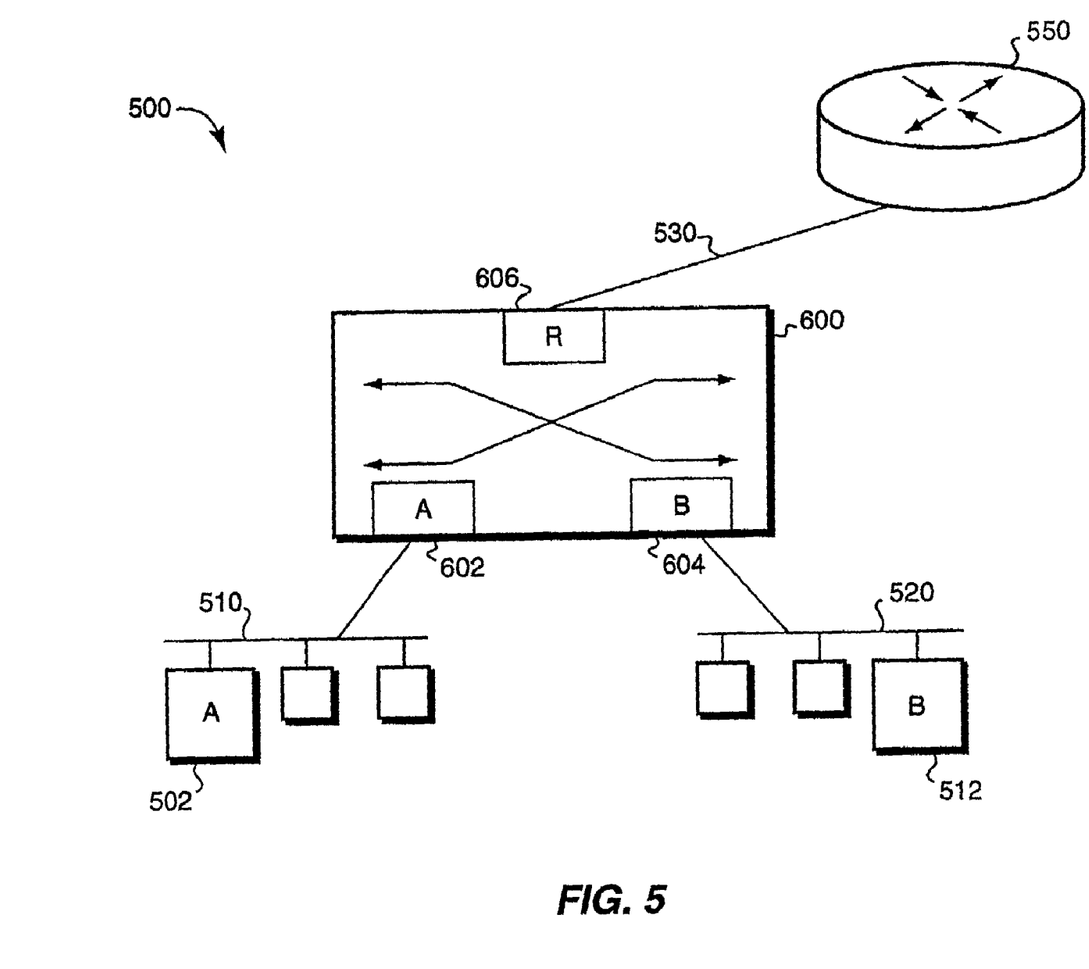
FIG. 5 is a block diagram of a computer internetwork comprising a collection of interconnected communication media and subnetworks attached to a plurality of stations.

FIG. 5 is a block diagram of a computer internetwork 500 comprising a collection of interconnected communication media and subnetworks attached to a plurality of stations. The stations are typically computers comprising end stations 502, 512 and intermediate stations 550, 600. Specifically, the intermediate station 550 is a router and the intermediate station 600 is a network switch, whereas the end stations 502, 512 may include personal computers or workstations.

Each station typically comprises a plurality of interconnected elements, such as a processor, a memory and a network adapter. The memory may comprise storage locations addressable by the processor and adapter for storing software programs and data structures associated with the inventive mapping technique. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the techniques described herein.

The subnetworks included within internetwork 500 preferably comprise local area networks (LANs) 510 and 520, although the invention may work advantageously with other communication media such as point-to-point network links. In the illustrative embodiment, the switch 600 is a multi-port bridge comprising, at least, port A 602 coupled to Station A via LAN 510, port B 604 coupled to Station B via LAN 520 and port R 606 coupled to router 550 (or another switch) via link 530. Communication among the stations of the internetwork is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange (IPX) protocol, AppleTalk protocol or DECNet protocol.

Since stations A and B are on different subnetworks, they communicate by way of router 550. For example, station A forwards a frame through switch 600 to router 550 and the router performs a routing decision using, e.g., the IP network protocol, to route the frame through the switch to Station B. The switch 600 provides a "switching" function for transferring information, such as frames, among entities coupled to its ports. In addition, the switch provides basic functions of a bridge including filtering of data traffic by Media Access Control (MAC) address, "learning" of a MAC address based upon a source MAC address of a frame and forwarding of the frame based upon a destination MAC address.

There are generally two values assigned to each port of the switch: a virtual local area network (VLAN) value and an index value. The index is essentially a 10-bit, hard-coded value that uniquely identifies the port to the switch. An example of a switch configured with index values for identifying ports and suitable for use with the present invention is disclosed in copending and commonly-assigned U.S. patent application Ser. No. 08/621,720, now issued as U.S. Pat. No. 5,796,732, filed Mar. 28, 1996, titled Architecture for an Expandable Transaction-Based Switching Bus, which application is hereby incorporated by reference in its entirety.

A 10-bit VLAN value assigned to each internal port of the switch associates the port with a particular VLAN group within the switch. Each VLAN may be further associated with a subnet or broadcast domain so as to limit broadcasting of frame messages to a defined subset of stations. Prior attempts to control broadcast domains for different protocols supported by a switch have presented problems and the present invention is generally directed to a switch capable of efficiently controlling such broadcast domains.

Broadly stated, the invention relates to a derived VLAN mapping technique that enables centralized control of broadcast domains by a switch capable of supporting different protocols carried within frames that are distributed throughout an internetwork. Associated with each incoming frame received at the switch are characteristics such as protocol type and/or subnet information, and associated with each input port of the switch are characteristics such as VLAN and/or index values. Utilizing certain of these characteristics, a derived VLAN value is generated that allows users to create arbitrary VLAN domains which may, in turn, reduce broadcast traffic received by stations of the domains.

The derived VLAN mapping technique manifests as a plurality of illustrative embodiments that allow segregation of broadcast domains based on the protocol type, port VLAN, subnet and/or index values. Depending upon the embodiment, certain of these values are manipulated to create a mapping address that selects one of a plurality of entries of a translation structure. Each entry of the structure is configured with a derived VLAN value that is used to access a single forwarding database to, inter alia, determine a destination and output port for the frame.

According to one embodiment of the invention, a port VLAN-based derived VLAN mapping technique is provided. Here, the header of a frame (such as Ethernet frame 200 of FIG. 2) is received at a port and parsed to determine its protocol type (stored in protocol field 230). The frame is then assigned a 2-bit protocol number or code. For example, an IP protocol frame may be assigned protocol code 0 (00), an IPX frame may be assigned protocol code 1 (01), an AppleTalk/DECNet/Vines frame may be assigned protocol code 2 (10) and any other protocol-type frame may be assigned protocol code 3 (11). The assigned 2-bit protocol code is concatenated with the 10-bit value of the VLAN of the port on which the frame is received to form a 12-bit mapping address. Note that the order of concatenation is inconsequential; it does not matter whether the 2-bit protocol value comprises the most significant bits (MSB) or least significant bits (LSB) of the mapping address.

The mapping address is fed to a translation structure having a plurality of entries, each of which is preconfigured by software with a derived VLAN value associated with a respective address. For the port VLAN-based embodiment of the invention, the translation structure is preferably a mapping random access memory (RAM) translation structure that conforms to a predetermined mapping relation. Illustratively, 12 bits of mapping address are provided to an input of the RAM which, in response to a match ("hit") with a corresponding address entry, produces a 10-bit derived VLAN value at its output. The illustrative entry field and mapping address lengths are constrained by a 10-bit VLAN address space available at the port; however, it is understood that other field and address lengths may be used within the teachings of the invention. The novel derived VLAN value is used internally within the switch for purposes similar to that of a typical VLAN value, i.e., for accessing a forwarding database, for flooding incoming frames and for learning MAC addresses.

Essentially, the invention is directed to a generic, yet flexible, mapping technique that provides a customer with a powerful management and configuration tool for installation sites. Such a tool may be used to arbitrarily define boundaries based on the VLAN value of a port receiving an incoming frame and on the protocol type of the packet. Configuration mapping, and thus transfer of frames among ports, is controlled by software of the switch by computing port VLAN× protocol to create a derived VLAN. Note that the × (times) function is not a conventional multiplication operation, although the function does operate to increase the quantity of VLAN designations. In the case of the port VLAN-based mapping technique described herein, the invention operates to derive as many VLAN designations as there are protocol types.

For example, assume a port is assigned a VLAN color designation (such as green) but that there may be as many as four protocol-type frames passing through the port. According to the port VLAN-based mapping technique, an IP frame passed through the green VLAN port is processed to derive another VLAN color (e.g., orange), an IPX frame passing through the geen VLAN port is processed to derive yet another VLAN color (e.g., brown), an AppleTalk frame is processed to derive still another VLAN color (e.g., purple) and a DECNet frame is processed to derive still yet another VLAN color (e.g., magenta). In this context, "multiplying" port VLAN times protocol functions to increase the quantity of VLAN designations.

The smallest granularity of apportionment for the embodiment described above is the VLAN designation of a port because each frame received by the switch on an input port is associated with that port's VLAN designation. This creates a problem when attempting to apportion the ports of a switch among subnets of different protocols. For example, assume all the ports of a switch are assigned one VLAN color designation for IPX protocol frames of a large IPX network, yet it is desired to designate subsets of the ports different VLAN designations for various IP subnets. The port VLAN-based mapping technique generally does not accommodate such a configuration because the port VLAN combined with the protocol type produces a derived VLAN designation that may not differentiate among various subnets of the same protocol.

Accordingly, an alternate embodiment of the invention is provided that generates a mapping address based on a subnet of an incoming frame rather than the protocol type of the frame. This subnet-based derived VLAN mapping technique extracts subnet information from the incoming frame and provides that information as a mapping address to a different translation structure to generate an address extension type for the VLAN. Translation mapping for this alternate embodiment is preferably effected by a longest-match content addressable memory (CAM). Specifically, the switch performs a longest match on the subnet portion of the address using the CAM, which outputs a derived VLAN value.

The subnet-based derived VLAN embodiment allows apportioning of a single, common VLAN designation that spans all of the ports of a switch to the granularity of a broadcast domain based on the subnet number of an incoming frame. The subnet-based mapping technique utilizes a separate forwarding database based on the subnet of the incoming frame. Since only certain protocols support subnetting, a determination of the protocol type of the incoming frame is initially made at an input port. If the protocol (such as IP) supports subnetting, the subnet-based mapping technique (rather than the port VLAN-based approach) is preferably used for processing the frame.

As noted, a frame received at an input port of the switch may be processed in accordance with the port VLAN-based mapping technique described above to generate a derived VLAN associated with the frame. The derived VLAN is used to access the forwarding table and determine an output port associated with a destination. In some cases, the output port may be a trunking port (i.e., a source trunking port). Trunking ports are used for transferring frames over trunking links directly connecting switches. The frame transmitted from the source trunking port may carry VLAN information with it over a trunking link for use by the destination switch. Thus, the VLAN designation of destination trunking port may change. If the output port for the destination result is a trunking port, one of two implementations of the derived VLAN invention may be employed.

In one implementation, the original VLAN designation assigned to the frame at the input port of the switch is appended onto an interlink switch (ISL) header of a frame. The ISL header contains a VLAN field for carrying a VLAN value over a trunking link (such as an IEEE Std 802.1q trunking link or an ISL link) to a destination trunking port. An example of an ISL header used for transmitting information between trunking ports is disclosed in copending and commonly-assigned U.S. patent application Ser. No. 08/623,142, now issued as U.S. Pat. No. 5,742,604, filed Mar. 28, 1996 titled Interswitch Link Mechanism for Connecting High-Performance Network Switches, which application is hereby incorporated by reference in its entirety. The destination switch of the destination trunking port re-derives the VLAN using the original, non-derived VLAN in accordance with the port VLAN-based mapping technique described herein.

Although the implementation described above enables interoperability between old and new switches, the overhead associated with ensuring that the non-derived VLANs are globally recognized (i.e., among switches) is high. In another implementation of the invention, the derived VLAN is transmitted from the source trunking port over the trunking link to the destination trunking port. The derived VLAN value may then be is used to access the forwarding database. This implementation obviates the use of the port VLAN-based mapping technique to derive a VLAN. In addition, only the derived VLAN values need be globally recognized; in other words, passing of the derived VLANs allows re-use of the non-derived VLAN values within each switch.

Figure 6:
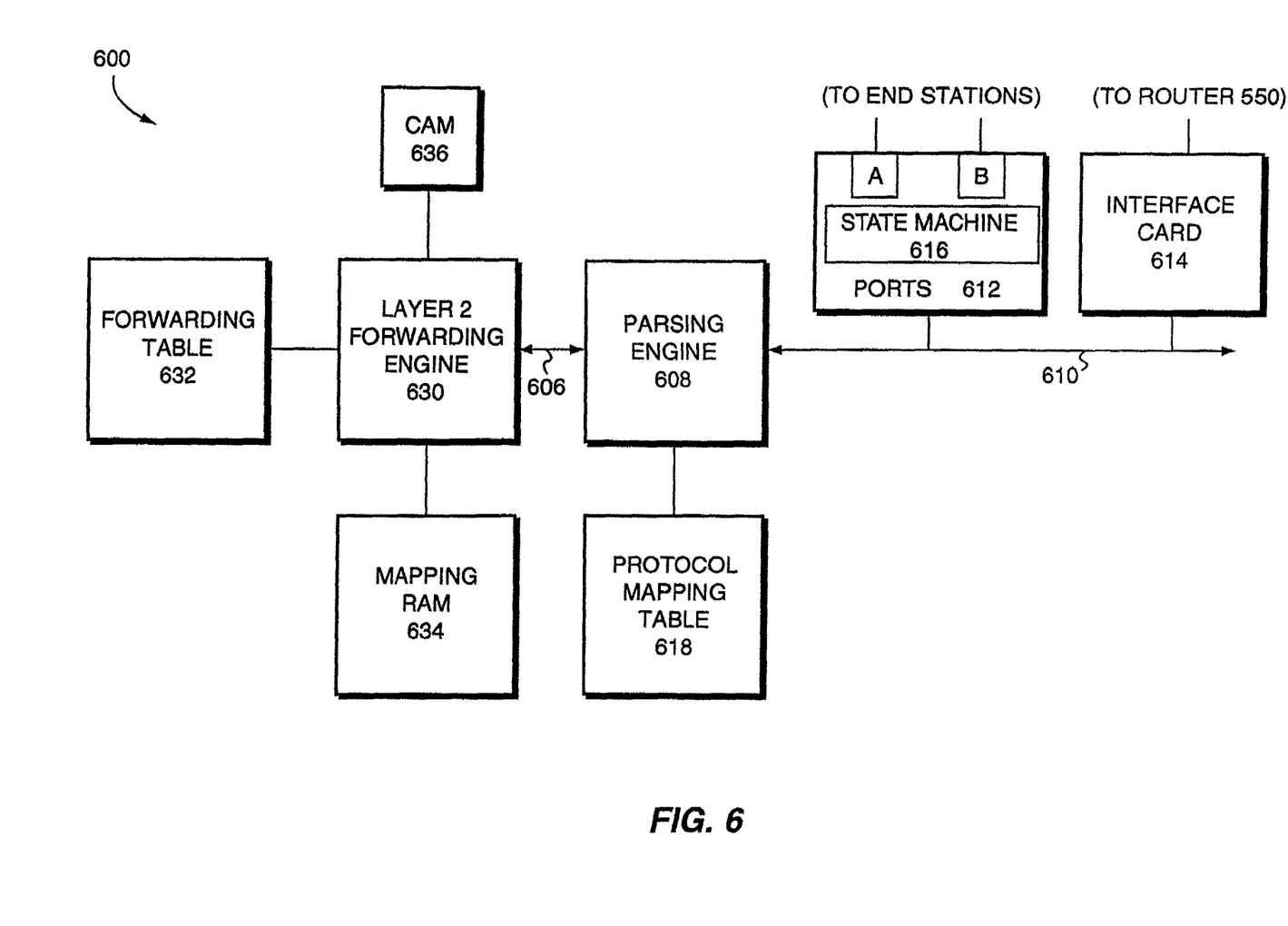
FIG. 6 is a schematic block diagram of a network switch configured to implement a novel derived virtual local area network (VLAN) mapping technique in accordance with invention.

FIG. 6 is a schematic block diagram of the network switch 600 configured to implement the derived VLAN mapping function in accordance with invention. The switch includes a layer 2 forwarding engine 630 configured to access and process information stored in forwarding database 632 and translation structures, such as mapping RAM 634 and CAM 636. The forwarding database is preferably organized as a centralized table structure used for learning and forwarding operations. The forwarding engine 630 determines actions to be taken on frames passing through the switch 600 and drives the results over a result bus 606.

The switch 600 further includes a parsing engine 608 that receives the results from the result bus 606 and drives aggregate information onto a switching bus 610 consisting of a data bus portion and a control bus portion. The parsing engine 608 may further extract pertinent information from frames/packets traversing the switching bus 610 and transfer that information over the result bus 606. For example, the engine 608 extracts the contents of the protocol type field of a frame and maps those contents to a 2-bit protocol code using a protocol mapping structure (table) 618 coupled to the engine.

Port card ("ports") 612 provides the port interface circuitry needed to connect the switching bus 610 to the physical media of the network, whereas an interface card 614 provides the interface circuitry needed to couple the switch 600 to the router 550. Circuit 616 located on the port card 612 prefixes a VLAN value (and index value) associated with the input port to an incoming frame. In the illustrative embodiment, the forwarding engine 632, the parsing engine 608 and the circuit 616 are each preferably implemented as a plurality of hardware registers and combinational logic configured to produce a sequential logic circuit, such as a state machine.

Each port (including a trunking port) of the switch generally stores and forwards an incoming frame, i.e., the frame is stored while it is determined to which output port the frame is forwarded. The layer 2 forwarding engine 630 is generally a passive device with the exception that it sends a result over the result bus 606 indicating the output port(s) for the frame. The device also sends the derived VLAN value over the result bus so that the derived VLAN can be optionally used by the trunking port (instead of the original VLAN of the incoming frame) for transmission to the destination switch, as described further herein.

Figure 7:
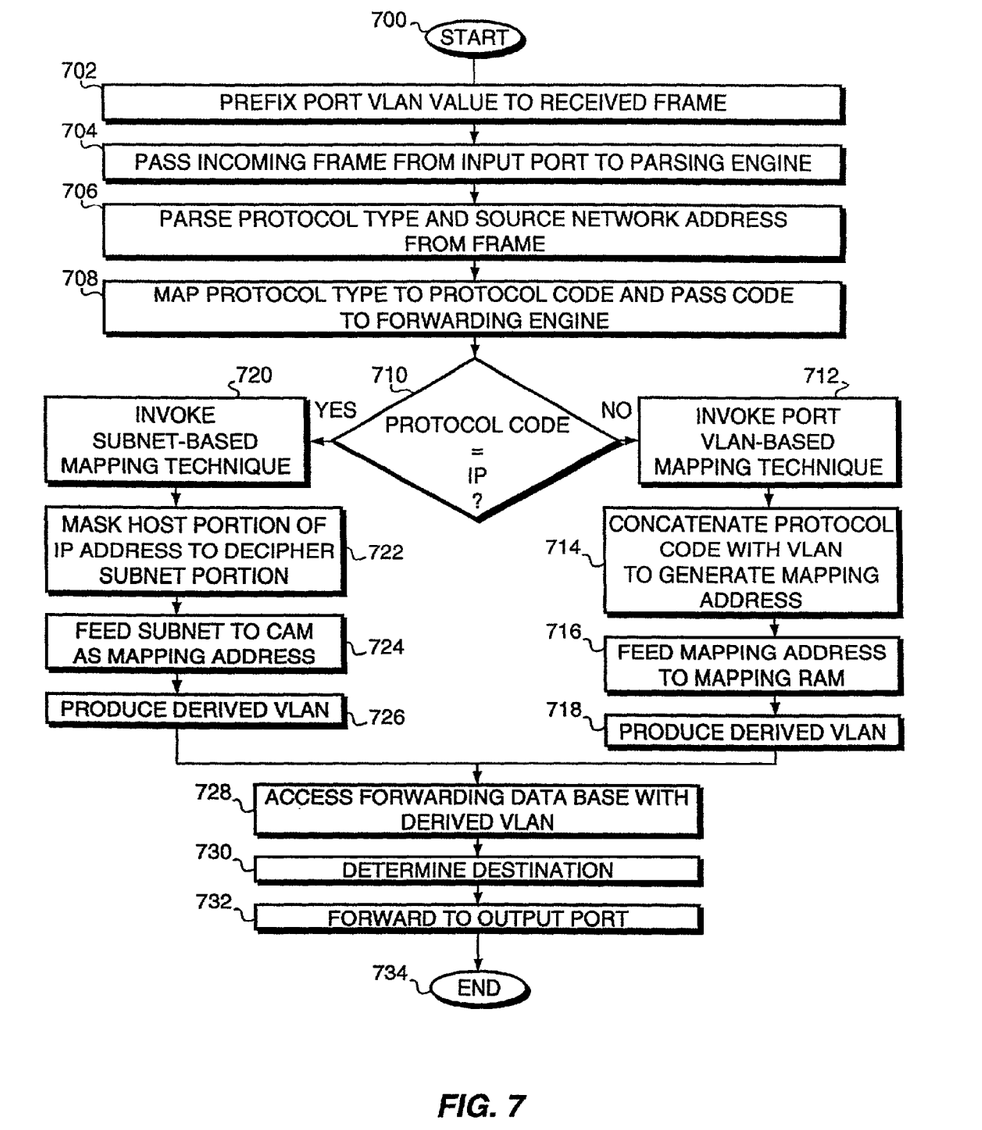
FIG. 7 is a flowchart illustrating a sequence of operation of the novel derived VLAN mapping technique.

FIG. 7 is a flowchart illustrating a sequence of operation of the inventive derived VLAN mapping technique. The sequence starts at Step 700 and proceeds to Step 702 where a frame is received at an input port of the switch and the state machine 616 prefixes a VLAN value associated with the input port to the received frame. At Step 704, the frame, including the prefixed VLAN value, is passed to the parsing engine. At Step 706, the parsing engine parses (i) the protocol-type contents from the frame and (ii) the entire source network address from the packet header encapsulated within the frame. Utilizing the protocol mapping table, the parsing engine maps the contents of the parsed protocol field to a 2-bit protocol code and passes the code (along with the port VLAN value) to the layer 2 engine (Step 708).

In Step 710, a determination is made as to whether the protocol code specifies an IP protocol type frame. If not, the frame is processed in accordance with the port VLAN-based mapping technique (Step 712) and, in Step 714, the layer 2 engine concatenates the 2-bit protocol code with the 10-bit VLAN value to generate a 12-bit mapping address. The mapping address is provided to the mapping RAM in Step 716 and, in Step 718, the mapping RAM table outputs a derived VLAN value.

Returning to Step 710, if the protocol code specifies an IP protocol, the frame is processed in accordance with the subnet-based derived VLAN mapping technique (Step 720). In Step 722, the parsing engine passes the source IP address to the layer 2 engine 630 which masks the host portion 310 of the address 300 (FIG. 3) to decipher, and thus obtain, the subnet. The resulting subnet portion (i.e., mapping address) is provided to a longest match CAM in Step 724 where the subnet is compared with the contents of the CAM entries to perform a longest match, prefix routing operation. Note that the entries of the CAM are configured by software with all the subnets in the system and with derived VLAN values associated with those subnets. In response to a match, the CAM outputs a derived VLAN value at Step 726.

In summary, if the protocol-type of a frame is IP, the subnet-based derived VLAN mapping technique is preferably used and if the protocol type is anything else (such as IPX), the port VLAN-based derived VLAN mapping technique is used. In either case, the resulting derived VLAN value is used to access the forwarding database at Step 728 to (i) associate with a MAC address for learning purposes and (ii) acquire ("lookup") a destination MAC address for forwarding purposes. Once the destination is determined (Step 730), the frame is forwarded to an output port for transmission to the destination at Step 732 and the sequence ends at Step 734.

While there has been shown and described an illustrative embodiment for controlling broadcast domains for different protocols contained within frames passing through a switch of a computer internetwork using a derived VLAN mapping technique, it is to be understood that various other adaptations and modifications may be made within the spirit and scope of the invention. For example, the port VLAN-based embodiment may be extended to provide programmable broadcast filtering operations that utilize, and operate seemlessly with, existing switches configured with conventional VLANs. Here, the VLAN associated with an existing port card is mapped along with the protocol of the incoming frame to provide a derived VLAN. Broadcasts (floods) to VLANs are transformed to floods to a subset of ports (derived VLAN) which function to effectively reduce flooded traffic to the ports.

Another adaptation involves an end station which, in accordance with IEEE Std. 802.1q, provides a VLAN within an Ethernet packet. If an incoming frame (both 802.1q frames and trunking frames) at an input port of the switch is tagged, i.e., it is already assigned a VLAN value other than zero, the switch honors that VLAN as the derived VLAN and bypasses the mapping function. Note that a VLAN is not assigned if the contents of the appropriate field of the frame have a value of zero (all bits=0).

If a VLAN is not assigned or if there is a mix of 802.1q and non-802.1q port cards in the switch, VLANs are derived for those frames received at non-trunking and non-802.1q ports. In yet another alternate embodiment of the invention, an index-based derived VLAN mapping technique may be utilized. This embodiment employs the same apparatus and operational sequence as the port VLAN mapping technique (FIG. 7) to derive the VLAN value with the exception that the unique index value of the input port (rather than the port VLAN assigned to the input port) is used to generate the mapping address. That is, the port VLAN-based hardware is used to map the contents of the protocol field to a 2-bit protocol code, combine the code with the index to generate a mapping address, and access the mapping RAM with the mapping address to produce the derived VLAN.

The resulting derived VLAN value is then used to access the forwarding database to, as described herein, determine a destination for the frame.

More specifically, the derived VLAN is generated using the port index concatenated with the protocol of the incoming frame; i.e., index×protocol=derived VLAN. This index-based mapping technique allows an administrator (instead of the end stations) to control an arbitrary assignment of ports to derived VLANs based on the protocol of frames appearing on those ports. This also eliminates any connection between different protocols and their designated VLANs.

Figure 8:
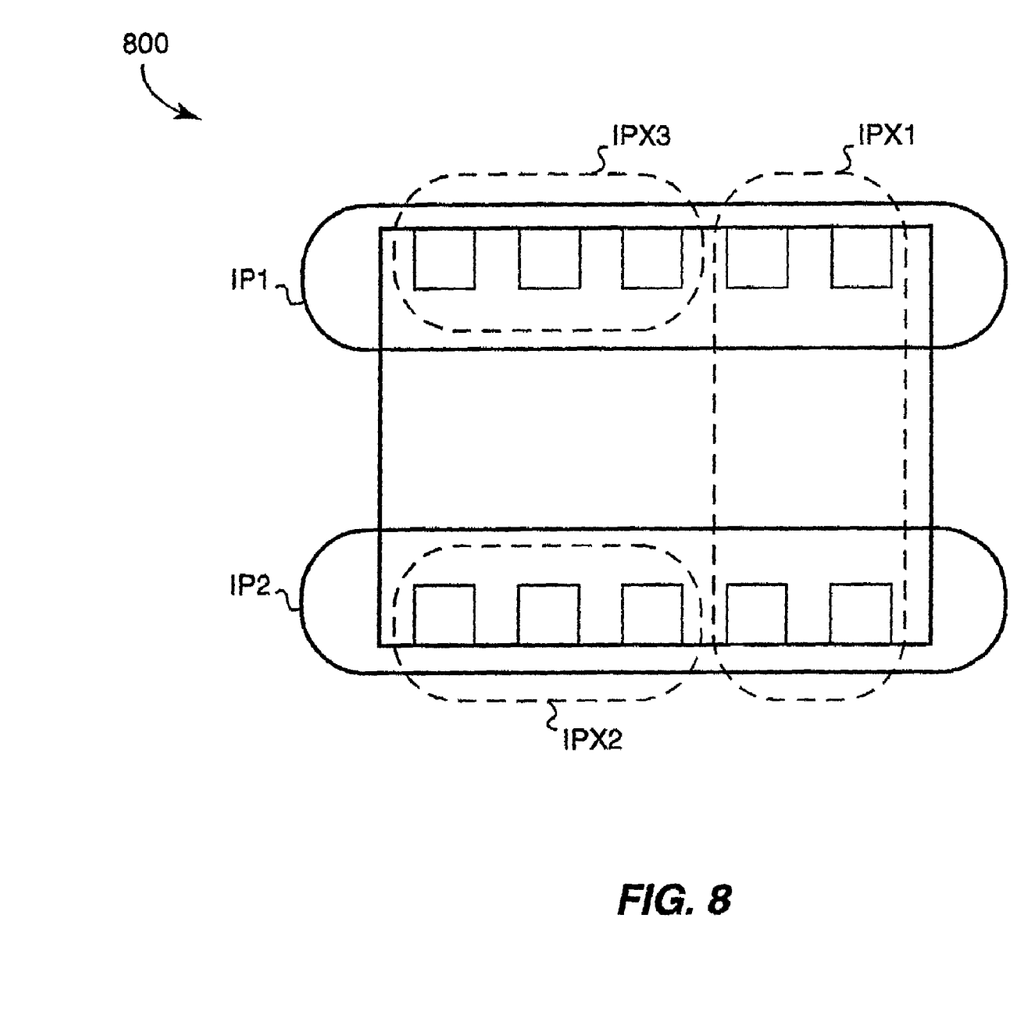
FIG. 8 is a schematic diagram illustrating application of index-based and port VLAN-based mapping function embodiments of the present invention.

FIG. 8 is a schematic diagram illustrating application of the index-based mapping function in relation to the port VLAN-based mapping function with respect to ports of multi-port switch 800. The dotted circles encompass three groups of ports configured as IPX networks 1-3, each having a designated VLAN. The solid circles encompass two groups of ports configured as IP subnets 1-2, each of which also has a designated VLAN. Note that the IPX and IP protocol traffic is segregated among their respective networks and subnets. This type of configuration can be achieved using the index-based derived VLAN technique because there are different protocols. However, such a configuration cannot be realized with port VLAN-based derived VLANs because that technique requires a specific VLAN association per port.

It should be noted that the index-based mapping algorithm may be modified to enable overlap of the derived VLANs such that both the IP and IPX protocol codes are concatenated with the port index to produce a mapping address that maps to the same derived VLAN value. The modified index-based VLAN technique requires that all switches within a bridged domain/subnet/network be configured to implement the derived VLAN mapping technique and that the trunking ports carry the derived VLAN across trunking links.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method of operating a switch for frames in a computer network, comprising:

receiving a frame (received frame) at a port of said switch, said received frame containing one or more indicia of frame type, said one or more indicia of frame type including an indicia of a protocol type;

accessing a port index value associated with the port;

deriving a virtual local area network (derived VLAN) value in response to said one or more indicia of frame type and said port index value;

accessing a forwarding data base with said derived VLAN value to determine a destination address; and, forwarding, in response to said derived VLAN value, said received frame to an output port for transmission to the destination address.

2. The method of claim 1 wherein the step of deriving further comprises:

generating a protocol code from the indicia of protocol type;

combining the protocol code with the index value to produce a mapping address; and accessing a memory structure with the mapping address to obtain the derived VLAN.

3. The method of claim 1 wherein the indicia of protocol type indicates an Internet Protocol (IP) protocol type.

4. An apparatus to forward frames in a computer network, comprising:

a port to receive a frame (received frame), said port associated with an index value, said received frame containing one or more indicia of frame type, said one or more indicia of frame type including an indicia of a protocol type;

a parsing engine to derive a virtual local area network (derived VLAN) value in response to said one or more indicia of frame type and said index value;

a forwarding database configured to use said derived VLAN value as input and to yield a destination address as output; and, an output port to transmit said received frame, in response to said derived VLAN value, to said destination address.

5. The apparatus as in claim 4 further comprising:

a protocol mapping table to map the indicia of protocol type to a protocol code; and wherein the parsing engine is configured to combine the protocol code with the index value to produce a mapping address and to access a memory structure with the mapping address to obtain the derived VLAN.

6. The apparatus as in claim 4 wherein the indicia of protocol type indicates an Internet Protocol (IP) protocol type.

7. An apparatus to forward frames in a computer network, comprising:

means for receiving a frame (received frame), said received frame containing one or more indicia of frame type, said one or more indicia of frame type including an indicia of a protocol type;

means for accessing an index value associated with the means for receiving a frame;

means for deriving a virtual local area network (derived VLAN) value in response to said one or more indicia of frame type and said index value;

means for accessing a forwarding database with said derived VLAN value to de-termine a destination address; and, means for forwarding, in response to said derived VLAN value, said received frame to an output port for transmission to the destination.

8. A method of operating a switch for frames in a computer network, comprising:

receiving a frame (received frame) at a port of said switch, said received frame containing one or more indicia of frame type, said one or more indicia of frame type including an indicia of a protocol type;

accessing a virtual local area network (VLAN) value associated with the port;

deriving a virtual local area network (derived VLAN) value for use internal to said switch by, generating a protocol code from the indicia of protocol type, combining the protocol code with the VLAN value to produce a mapping address, and accessing a memory structure with the mapping address to obtain the derived VLAN value;

accessing a forwarding database with said derived VLAN value to determine a destination address; and, forwarding, in response to said derived VLAN value, said received frame to an output port for transmission to the destination address.

9. The method of claim 8 wherein said indicia of frame type further comprises:

a subnet value.

10. The method of claim 8 further comprising:

deriving a MAC address from said derived VLAN value and forwarding said received frame to the output port for transmission to a destination having said MAC address.

11. The method of claim 8 wherein the indicia of protocol type indicates an Internet Protocol (IP) protocol type.

12. An apparatus to forward frames in a computer network, comprising:

a port to receive a frame (received frame), said port associated with a virtual local area network (VLAN) value, said received frame containing one or more indicia of frame type, said one or more indicia of frame type including an indicia of a protocol type;

a protocol mapping table to map the indicia of protocol type to a protocol code;

a parsing engine to derive a virtual local area network (derived VLAN) value, wherein the parsing engine is configured to combine the protocol code with the VLAN value to produce a mapping address and to access a memory structure with the mapping address to obtain the derived VLAN;

a forwarding database configured to use said derived VLAN value as an input and to yield a destination address as an output; and an output port to transmit said received frame, in response to said derived VLAN value, to said destination address.

13. The apparatus as in claim 12 further comprising:

a forwarding engine for forwarding said received frame in response to said derived VLAN value and said destination address.

14. The apparatus as in claim 12 wherein the indicia of protocol type indicates an Internet Protocol (IP) protocol type.

15. A method comprising:

receiving a frame at a input port, the frame including a protocol type;

accessing a virtual local area network (VLAN) value associated with the input port;

associating the frame with a protocol code based on the frame's protocol type;

concatenating the protocol code together with the VLAN value to produce a mapping address;

applying the mapping address to a memory structure to obtain a derived VLAN value that is based upon both the frame's protocol type and the VLAN value associated with the input port, the derived VLAN value to differ from at least one other derived VLAN value for another frame received on the input port, but having a different protocol type;

accessing a forwarding database with the derived VLAN value to determine a destination address; and forwarding the frame to an output port for transmission to the destination address.

16. The method of claim 15 wherein the step of associating further comprises:

mapping the protocol type to a protocol code using a protocol mapping table.

17. The method of claim 15 wherein the frame includes the protocol type in a protocol type field.

18. The method of claim 15 wherein the protocol type indicates Internet Packet Exchange (IPX) protocol.

19. An apparatus comprising:

an input port to receive a frame, the frame including a protocol type, the input port associated with a virtual local area network (VLAN) value;

a protocol mapping table to map the frame's protocol type to a protocol code;

an engine to concatenate the protocol code together with the VLAN value to produce a mapping address, and to apply the mapping address to a memory structure to obtain a derived VLAN value that is based upon both the frame's protocol type and VLAN value associated with the input port, the derived VLAN value to differ from at least one other derived VLAN value for another frame received on the input port, but having a different protocol type;

a forwarding database to use the derived VLAN value to determine a destination address; and an output port to transmit the frame to the destination address.

20. The apparatus of claim 19 wherein the frame includes the protocol type in a protocol type field.

21. The apparatus of claim 19 wherein the protocol type indicates Internet Packet Exchange (IPX) protocol.

22. A method comprising:

receiving a frame at an input port, the frame including a protocol type and a source address;

in response to the protocol type indicating a particular protocol type, parsing the source address to obtain a subnet value;

applying the subnet value to a memory structure to map the subnet value to a derived VLAN value, the derived VLAN value to differ from at least one other derived VLAN value for another frame received on the input port, but having a different subnet value;

accessing a forwarding database with the derived VLAN value to determine a destination address; and, forwarding the frame to an output port for transmission to the destination address.

23. The method of claim 22, wherein the particular protocol type is Internet Protocol (IP).

24. An apparatus comprising:

an input port to receive a frame, the frame including a protocol type and a source address;

an engine to, in response to the protocol type indicating a particular protocol type, parse the source address to obtain a subnet value, and to apply the subnet value to a memory structure to map the subnet value to a derived VLAN value, the derived VLAN value to differ from at least one other derived VLAN value for another frame received on the input port, but having a different subnet value;

a forwarding database to use the derived VLAN value to determine a destination address; and an output port to transmit the frame to the destination address.

25. The apparatus of claim 24, wherein the particular protocol type is Internet Protocol (IP).

* * * * *

UNITED STATES PATENT AND TRADEMARK OFFICE
CERTIFICATE OF CORRECTION

| | |
|---|---|
| PATENT NO. | : 7,577,142 B2 |
| APPLICATION NO. | : 09/755512 |
| DATED | : August 18, 2009 |
| INVENTOR(S) | : Raymond Kloth |

It is certified that error appears in the above-identified patent and that said Letters Patent is hereby corrected as shown below:

Col. 9, Line 2, please replace "geen" with "green"

Col. 10, Line 18, please replace "then be is used" with "then be used"

Signed and Sealed this
Twenty-second Day of March, 2011

David J. Kappos
*Director of the United States Patent and Trademark Office*